March 1, 1949.　　　　L. A. SMITH　　　　2,463,063
CUTTING TOOL
Filed May 7, 1943　　　　　　　　　　2 Sheets-Sheet 1
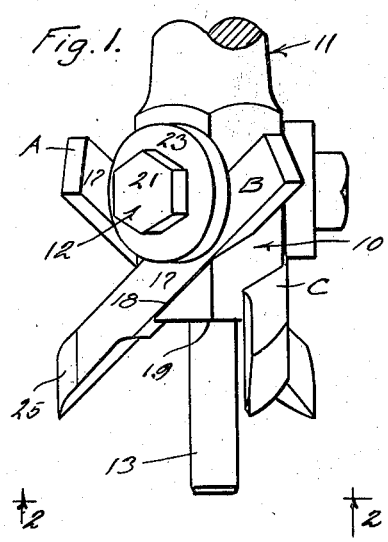
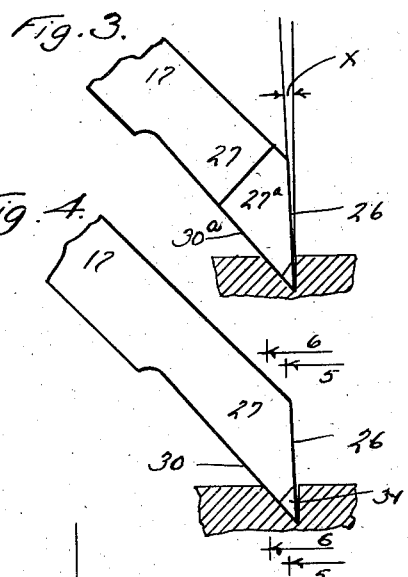
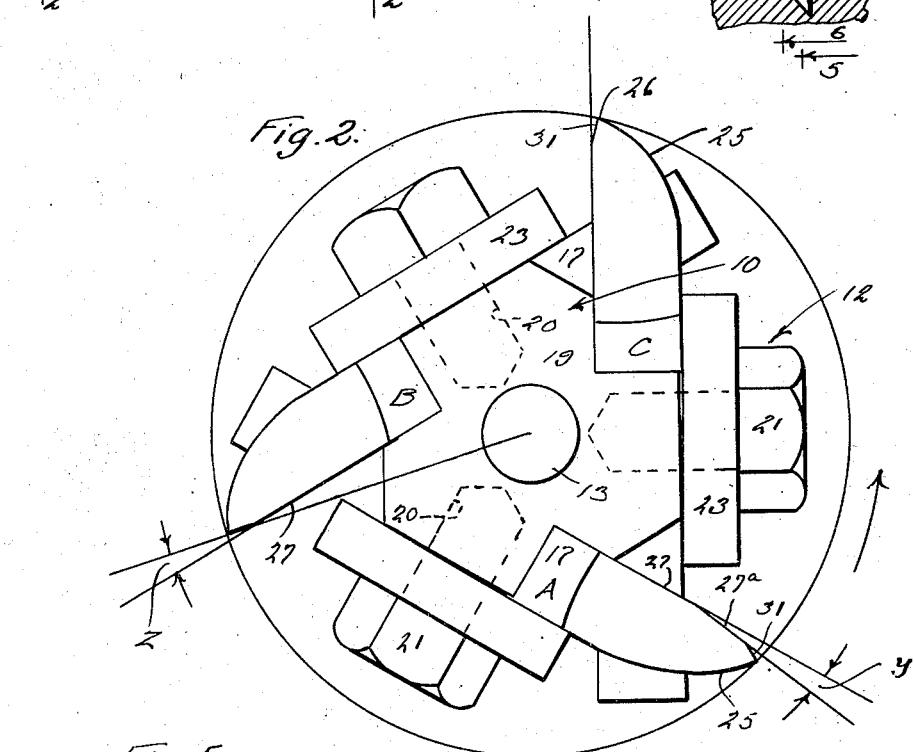
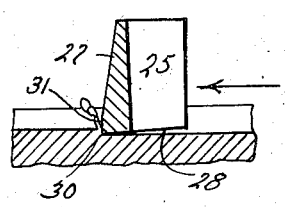
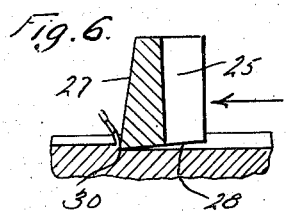
Inventor
Lawson A. Smith
by [signature]
Attorney March 1, 1949.   L. A. SMITH   2,463,063
CUTTING TOOL
Filed May 7, 1943   2 Sheets-Sheet 2
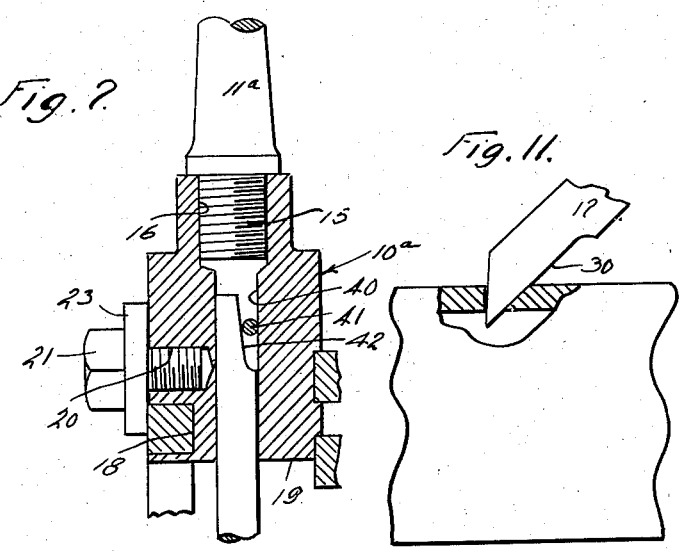
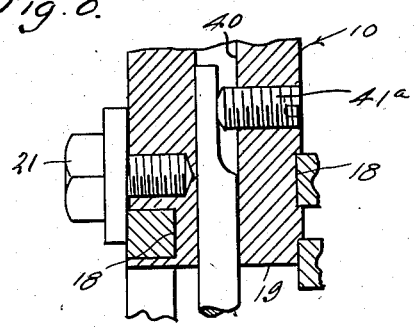
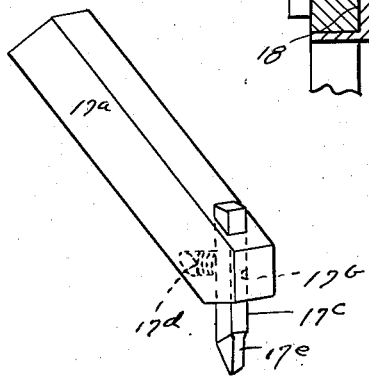
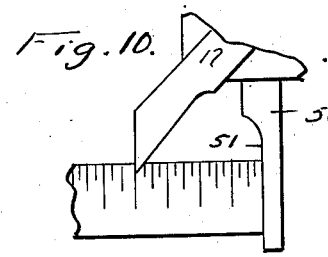
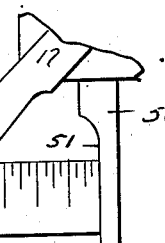
Inventor
Lawson A. Smith
by W. H. Maxwell
Attorney Patented Mar. 1, 1949

2,463,063

UNITED STATES PATENT OFFICE 2,463,063

CUTTING TOOL

Lawson A. Smith, Los Angeles, Calif., assignor to Robert H. Clark, Los Angeles, Calif.

Application May 7, 1943, Serial No. 485,984

6 Claims. (Cl. 77—69)

This invention has to do with a cutting tool and has particular reference to a tool operable to cut round openings in various materials. A general object of the invention is to provide a simple, practical, efficient and smooth operating tool of this character.

It is generally recognized that in the operation of a cutting tool and particularly a metal cutting tool there is a marked tendency for the tool or the work, or both, to vibrate or chatter. This tendency varies with working conditions such as the material being cut, the speed of cutting, etc. In the large majority of cutting operations this tendency to chatter is present and results in irregularities in the cut surface. In some instances these irregularities are barely perceptible, while in other cases they are readily apparent.

A cutting tool that presents a plurality of cutting edges, one following another, offers many advantages, such as speed of cutting, distribution of loads and strains, balanced operation, etc. However, in the past attempts to provide such tools have resulted in structures that vibrate or chatter excessively.

The highly undesirable chattering of cutting devices having a number of cutting edges results from the fact that the cutters following one after another, and each having a like tendency to chatter or track one in the path of another, results in a compounding or amplification of the chatter.

I have, by my present invention, provided a cutter in which the tendency to chatter or vibrate is minimized and for all practical purposes eliminated. By my invention I have eliminated the tracking action that tends to multiply or augment the chatter, and I have established a cutter arrangement that operates rapidly, efficiently, and uniformly.

A primary object of my invention is to provide a cutting tool for cutting round openings in various materials having a plurality of cutting parts or edges so related or disposed as to eliminate or minimize the tendency of the tool to chatter as it works.

A primary object of this invention is to provide a multiple-cutter tool of the character described which makes it possible to cut holes of various sizes in various materials, including hard metals, with great speed and accuracy and with a minimum of wear and strain. By my present invention the power necessary for cutting an opening is minimized, time is saved, and general economy is effected by minimizing the requirements for repair, replacement or maintenance of the cutting tool.

Another object of the invention is to provide a hole cutting tool of the character referred to involving a pilot or centering device and an arrangement of cutters whereby the strains and pressures on the pilot are minimized with a resulting minimizing of friction and wear.

It is a general object of this invention to provide a cutting tool suitable for cutting a wide variety of materials, including steel, iron, and other metals, wood, plastic, etc., which preferably has three equally spaced cutters adjustable to cut openings of various sizes and which act simultaneously to take their respective portions of the feed pressure imparted to the tool, and which cutters are so positioned with respect to their carrying head and have their cutting edges so formed as to result in a smooth, steady operation of the tool.

It is another object of this invention to provide a cutter of the character mentioned in which a plurality of cutters are arranged around the central or principal axis of the tool so that the forces in the tool and work are distributed symmetrically. With the preferred construction I provide three cutters arranged with cutting edges substantially 120° apart around the axis of the tool. This results in a structure that is balanced as to stress and is symmetrical and balanced as to structure.

It is another object of this invention to provide a cutter of the character referred to having individually adjustable cutters arranged so that the cutting parts are maintained in proper position relative to the work in all positions of adjustment.

A further object of the invention is to provide a cutting tool having a cutter in which the leading point is dressed off to prevent excessive digging of the cutter into the material being cut. The tip of the cutter which tends to bite or dig into the material is, in accordance with my invention, slightly flattened or dressed away to develop a tendency to drag rather than to bite into the work.

Another object of the invention is to provide a cutting tool in which there is a plurality of cutters having cutting edges disposed in a manner to result in a balanced, smooth cutting action. The cutter of the present invention will operate to effectively cut a wide range of materials without variation in the dressing or shaping of the cutting parts and by reason of the principles of the present invention the cutting action is accomplished with a minimum of wear, with little or no vibration or chattering. Any vibration or chattering that may occur is not disagreeable or harmful either to the tool or to the work.

Another object of my invention is to provide a three bladed cutter in which the pressures and strains incidental to operation are distributed around the axis of rotation so that no part or portion is unduly strained and so that this tool operates efficiently either when rigidly held in a machine or when operated by a hand or portable unit.

A further object of the invention is to provide a tool of the character described which combines the advantages of a three bladed cutter with the action obtained by giving a slight drag effect to the tips of the cutters so that rapid smooth cutting is obtained without an excessive tendency to bite or grab the work.

Another object of my invention is to provide a multiple-cutter tool with a predetermined variation in cutting angle between the cutters making it possible to produce the parts of the device on a production basis and have them operate perfectly when assembled, thereby eliminating the necessity of hand finishing such as requires individual skill and judgment.

This application is filed as a continuation in part of my present pending application, Serial No. 449,905, filed July 6, 1942, entitled "Cutting tool," now abandoned.

The various objects and features of the present invention will be best and more fully understood from the following detailed description of typical embodiments of the invention, throughout which description I refer to the accompanying drawings, in which:

Fig. 1 is a side elevation of a typical, practical form of the invention. Fig. 2 is an enlarged face or end view of the tool embodying the invention, being an enlarged view taken as indicated by line 2—2 on Fig. 1, a circle being added to indicate the path of the cutting parts, and lines being added to indicate the angles at which the forward faces of the cutters are disposed. Fig. 3 is a front or face view of one of the cutters of the tool showing it as related to the material being cut. Fig. 4 is a view similar to Fig. 3 of another cutter of the tool. Fig. 5 is a transverse sectional view taken on line 5—5 on Fig. 4 showing the manner in which the cutter feeds into the work and illustrating how the tip portion of the cutter is dressed to prevent a tendency to bite or lead into the work. Fig. 6 is a view similar to Fig. 5 taken on line 6—6 of Fig. 4, showing the manner in which the tool cuts along the cutting edge removed from the tip portion. Figs. 7 and 8 are views illustrating two manners in which the pilot may be applied to the body of the tool, Fig. 7 also showing a modified construction whereby the shank and body are formed of separate parts. Fig. 9 is a perspective view of a modified form of cutter in which the cutter is formed of a permanent shank and a replaceable cutting tip dressed to have the desired cutting parts. Fig. 10 is a view showing a gauge applied to the tool in place of the pilot to facilitate adjustment or setting of the cutters. Fig. 11 is a view illustrating the manner in which the cutter of the present invention cuts through a curved surface, such as that of a pipe, without grabbing.

The tool provided by this invention is useful, generally, where it is desired to cut a hole or opening in a body of material. The invention can be used to cut openings in flat sheets or bodies of material or in round members such as pipes or boilers. Furthermore, the invention is suitable for use in operation on various materials. For instance, it may be used on various metals, plastics, fibers, woods, compositions, etc. It is also significant that the invention contemplates a tool embodying a multiplicity of cutters and in its preferred form provides a tool having three cutters. It is to be understood, however, that there are phases of the invention not confined to any particular number of cutters but which may be incorporated in structures involving two or more cutters.

The tool illustrated in Figs. 1 to 6, inclusive, of the drawings, includes, generally, a head or body 10, a shank 11 projecting from what I will term the upper end of the body, a plurality of cutters A, B and C, means 12 whereby the cutters are applied to the body to be rigidly held thereby and to project therefrom so that their cutting portions are properly related, as will be hereinafter described, and a pilot 13 projecting from the body to be concentric with the principal or longitudinal axis of the tool and to extend ahead of the cutters so that it may enter a pilot hole provided in the work to be cut.

The body 10, in accordance with the preferred form of the invention which includes three cutters, is a body or block of metal, preferably steel, hexagonal in cross sectional configuration and sufficiently long to carry the parts hereinafter described and of sufficient size and length, generally, to form a substantial or rigid base element for carrying the working parts. In a tool designed specifically for heavy work, as for instance for cutting steel or other metals, it may be desired to make the body 10 larger or more substantial than in a case where the tool is specially designed for working on light materials where the pressures or working strains are less severe. A design and proportioning of the body suitable for general machine shop use or practice is illustrated in Fig. 1 of the drawings. The body 10 has a forward or leading end 19 from which the cutters project.

The shank 11 of the tool shown in Fig. 1 is formed integrally with the inner or upper end of the body 10. The shank is designed to facilitate attachment of the tool to a machine or operating part and for this purpose it may be the usual tapered shank or stem found in machine tools. In the form of the invention illustrated in Fig. 7 the shank 11ᵃ, instead of being formed integrally with the body 10ᵃ, is a separate part provided with a threaded pin 15 which is engaged in a socket 16 provided in the upper end of the body 10ᵃ.

The cutters A, B and C are in a general way alike and each includes an elongate shank portion 17 which is engaged and held by the body 10 through the means 12 and an active or working end portion the details of which will be hereinafter described.

The means 12 for fitting or applying the cutters to the body 10 may, in accordance with the broader principles of the invention, be varied considerably. In the simple preferred form of the invention shown in the drawings each cutter is arranged in a channel provided for that purpose in the body 10 and a retaining device is provided for fixing the cutter rigidly to the body. Where there are three cutters A, B and C applied to a hexagonal body it is most advantageous to provide cutter-carrying channels 18 in every other surface around the body, as clearly shown in the drawings.

The several channels 18 are alike in size, shape and location so that the tool is symmetrical, each channel being formed at an angle through or across a face of the body so that it carries a tool in a manner to project downwardly from or beyond the lower end surface 19 of the body and outwardly so that its outer or cutting end portion is a substantial distance outwardly or radially removed from the body. The exact angle at which the cutter carrying channels are formed is not critical although it is preferred in practice to form them at an angle of about 38° relative to a plane at right angles to the longitudinal axis of the tool, as that results in a disposition of the cutters that facilitates a practical, effective dressing of the cutting ends of the tools, as will be hereinafter described.

The cutters may be formed of stock of various shapes, it being generally practical to employ cutter stock that is substantially square in cross section, in which case the channels are made sufficiently deep to receive the cutters so they project only slightly from the channels when resting on the bottoms thereof.

The means provided for securing the cutters in the channels may vary without departing from the present invention. In the case illustrated a threaded socket 20 is provided in each face which has a channel 18, the socket 20 being located near the channel. A cap screw, or the like, 21 is threaded into the socket 20 and a clamping ring 23 is carried on the cap screw and is of sufficient size to overlap or overhang the cutter. When the screw is tightened into the socket the ring bears against the cutter and thus frictionally clamps it rigidly in place relative to the body.

The design or formation of the active or cutting ends of the cutters is an important phase of the present invention. The cutting ends of the several cutters are, in a general way, alike. However, in certain important aspects they differ. I will proceed to describe first the general characteristics of the cutting or active end portion of the cutters common to all of them, and will refer to one cutter, it being understood that the description is applicable to all.

The flank portion 25 of the cutting end recedes from what I will term the vertical leading edge 26 of the cutter. This flank surface is curved and may be formed so that it is concentric with the principal axis of the tool when the cutter is withdrawn or set in a retracted position somewhat inward of the smallest opening to be cut by the tool. When thus formed the flank 25 has side clearance when the tool is in operation, this clearance being clearly illustrated in Fig. 2 of the drawings.

The vertical leading edge 26 may be finished to be parallel with the principal axis of the tool so that it operates to finish or ream the bore made by the tool, or it may, as I have illustrated, be pitched upwardly and inwardly at a slight angle to form a slight side clearance. This side clearance angle is indicated at X in Fig. 3.

The front or leading face 27 is preferably dressed so that the cutter has a back slope, that is, so that the surface at which the chips are formed recedes or slopes backward slightly as illustrated in Figs. 5 and 6. This slope facilitates clearance of the chips and with the bottom face 28 of the cutter defines the keenness of the cutter. The bottom face 28 is preferably dressed to extend rearwardly and slightly upward from the point where it intersects the forward face 27 so that there is bottom clearance, as illustrated in Figs. 5 and 6. The line of joinder of the forward face 27 and bottom face 28 forms or defines the cutting edge 30 as best illustrated in Fig. 6 of the drawings. Since the forward face 27 is dressed to have a back slope and the bottom face 28 is dressed to have clearance these faces meet to form a cutting edge 30 having considerable keenness, that is, a marked tendency to cut into the material which may tend to cause the cutter to bite or dig, if care is not exercised in feeding the cutter into the material.

To minimize or eliminate the tendency of the cutter to dig or bite into the material I dress the tip end portion 31 of the leading face 27 away or back so that this portion of the face is more nearly perpendicular to the direction of travel of the cutter or is more blunt. By thus dressing off the tip of the cutter it is given something of a drag action rather than a digging action. For most purposes it is only necessary to thus blunt the extreme end portion 31 of the face 27, as shown in the drawings, leaving the balance of the cutting edge 30 along the bottom margin of the face 27 keen to be highly efficient in its cutting action.

It will be observed that the channels 18, being cut in the faces of the body but not sufficiently deep to intersect the principal axis of the body, operate to carry the cutters A, B and C so that they are at angles to lines drawn radially from the principal axis through the tips of the cutters. This angular disposition of the cutters is indicated by the angle Z in Fig. 2. It is this bodily angular disposition of the cutters relative to radial lines which define what may be termed the front side slope or merely the side slope of the cutters. The combination of the side slope and the back slope form the actual chip angle or the face from which the chips are discharged after being parted by the cutting edge.

By forming or shaping the cutting portions of the several cutters A, B and C exactly as described, and as illustrated in Figs. 4, 5 and 6, and by forming the cutter carrying channels symmetrically in the body 10, the several cutters when adjusted to project equally from the body will have equal and like cutting action. Any tendency for one cutter to chatter will, because of the likeness of the several cutters, be found in all of the cutters and thus chattering action would be aggravated.

By my present invention I maintain the desirable form and dress of the cutting portions of the several cutters, but effect a variation between adjacent cutters, or at least between one cutter and the others, so that their cutting actions are not exactly alike but rather vary, particularly with reference to chattering, so that chattering action is neutralized or practically eliminated. In accordance with the invention I accomplish this by varying the side slope of one of the cutters so that the side slope angle of that cutter differs from the side slope angle of the other cutters. In practice a difference or variation of about 6° works satisfactorily.

In the embodiment of the invention illustrated I vary the side slope angle of cutter A so that it is different from that of cutters B and C. This is accomplished by dressing the portion 27ª of the leading or forward face 27 of cutter A back, as shown in Fig. 2, to form an angle Y with what otherwise would be the side slope angle. By thus disposing the portion 27ª of the forward face of cutter A at an angle different from the forward faces of cutters B and C, the cutting edge 30ª of cutter A, although it cuts in the same path as the other cutters, is disposed at a cutting angle slightly different from that of the cutting edges of cutters B and C, and thus will not track with the cutters B and C but will have a slightly different cutting angle and cutting action and will remove any chatter marks formed by the immediately preceding cutter and, if it should form any chatter marks, the following cutter will act to remove them.

In Figs. 1 and 2 I illustrate a pilot 13 projecting downwardly from the bottom face or leading end 19 of the body to extend ahead of the cutters and in Fig. 7 I illustrate a typical manner in which this pilot may be related to the body. A central or axial bore 40 is provided in the body extending upwardly from its lower end 19. A pilot pin extends into this bore. A transverse pin 41 is carried by the body to intersect the bore 40 and the upper end portion of the pilot pin is provided with a beveled face 42 to cooperate with the pin 41 and establish a wedging action to secure the pilot pin in place in the bore 40. In Fig. 8 I show a set screw 41ᵃ for holding the pilot in place. In practice a pilot drill may be used in place of a plain pilot pin.

In Fig. 10 I illustrate a gauge pin 50 applied to the body instead of the pilot pin, the gauge pin being for the purpose of facilitating arrangement of the cutters symmetrically preliminary to a cutting operation. The lower or projecting portion of the gauge pin 50 is flattened to present a face 51 which intersects the principal axis of the tool. An operator can set the cutters by placing a measure or scale against the face 51 so that it projects radially to the cutter to be set, the set of the cutter being determined from the scale thus located. When the several cutters are thus set in like manner the gauge pin may be removed and the pilot pin inserted. It is possible, of course, to set the cutter by means of suitable gauges or by measuring from a pilot pin such as is shown in Fig. 1.

In operation the tool is applied to a drill press, hand power unit, or other device suitable for driving it. In most cases a pilot opening is first formed in the work and then the tool is fed to the work so that the pilot pin 13 enters the pilot opening in the work, thus centering the tool relative to the work. As the tool is fed against the work the cutting points of the several cutters simultaneously engage the surface of the work, assuming of course that the work surface is flat, and as the tool is rotated the several cutters take a cut into the surface removing a chip, as illustrated in Figs. 5 and 6. The cutting operation proceeds as the tool is fed against the work. The symmetrical arrangement of the several cutters results in a balanced distribution of the strain and load, whereas the variation between the cutters hereinabove pointed out results in a checking or elimination of chatter that would otherwise develop. By thus having eliminated the tendency to chatter it is possible to feed the cutter faster than would be otherwise practical, and the tool is efficient and practical in operating on materials and under conditions that would be otherwise impossible or impractical.

It will be apparent that by eliminating or minimizing this tendency of the tool to bite or grab it is possible to use the tool in light machines or with portable power units and do satisfactory work. It is all but impossible to handle a tool of this type with a portable power unit unless it includes the features I have provided.

By providing three cutters I have provided a tool that is highly efficient on flat work and which also works effectively on irregular or curved work such as pipes. To bore a hole in the side wall of a pipe a two-bladed cutter is highly impractical. As such a tool revolves and is fed toward the pipe the two cutters strike and cut simultaneously and then are both free or clear of the work, resulting in irregular action that is to be avoided if possible. By providing three cutters the work is engaged so that except at the start of the cut there is always at least one cutter at the work, thus checking any tendency for the tool to race and distributing the cutting load so that the tool operates effectively. An important feature of the invention is the fact that the cutting edges of the cutters extend a substantial distance inward and also diagonally upward, as clearly shown in Figs. 3, 4 and 11, from the outermost ends or tips of the cutters. This gives the cutters supporting engagement with the work after the points have cut through the work, and prevents the cutters from grabbing in the manner common to ordinary tools provided for this type of work.

In Fig. 9 I illustrate a form of the invention in which I provide a sectional cutter. In this form of the invention each cutter includes a shank 17ᵃ provided at its outer end portion with a socket 17ᵇ which carries a cutting tip 17ᶜ, the tip being secured in the socket by a set screw 17ᵈ. The projecting portion 17ᵉ of the tip 17ᶜ may be dressed or finished in the manner hereinabove described so that it has the desired cutting action, clearance, etc.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A tool of the character described including, a body having a shank, and a multiplicity of cutters carried by the shank to equally project forward and laterally outward from the body, the outer ends of the cutters being dressed to have cutting edges cutting in the same path but at different angles relative to lines radial of the tool.

2. A tool of the character described including, a body having a shank, and a multiplicity of cutters carried by the body to equally project forward and outward from the body, the outer ends of the cutters being dressed to have cutting edges with different side slope angles but to cut in the same path.

3. A tool of the character described including, a body having a shank and having three circumferentially spaced channels formed in it at equal angles to a plane at right angles to the principal axis of the tool, a cutter carried in each channel, and means securing the cutters in the channels so they project equally from the body, the outer ends of the cutters being located substantially 120° apart around the principal axis of the tool and being dressed so each cutter has a cutting edge, the cutters being related so their cutting edges operate in the same path, the cutting edge of one cutter being disposed at an angle substantially 6° different from that of the edges of the other cutters to effect smooth operation of the tool.

4. A tool of the character described including, a body having a shank, and a multiplicity of cutters carried by the shank to equally project forward and laterally outward from the body, the outer ends of the cutters being dressed to have cutting edges cutting in the same path but at different side slope angles, the tip portions of the cutters at the outermost ends of the cutting edges being dressed back to have a drag action.

5. A three-blade cutter comprising a head, three elongated cutter bars mounted on a projecting angle outwardly and downwardly from equidistantly spaced points on said head, said cutter bars having cutting edges formed on the ends of the bars below the body and laterally outward thereof and set for co-planar contact with the work for simultaneously cutting a hole therein, at least one of the cutting edges of said cutter bars having an angle of contact with the work at variance from the angle of contact of the cutting edges of the other cutting bars, means for adjustably holding each of said cutter bars on said head entirely independent of the other cutter bars, and a central pilot projecting downwardly from the body.

6. A cutter of the character described including, a body hexagonal in cross sectional configuration, a shank projecting upwardly from the body, a central socket entering the body from its lower end, a pilot carried by the socket to project from the lower end of the body, alternate side faces of the body being provided with channels pitched to be angularly disposed relative to a plane normal to the vertical axis of the tool, a cutter slidably carried in each channel to project outwardly and downwardly below the body, individual clamp means for setting the cutters in the channels, the outer ends of the cutters being curved on radii less than that of the smallest opening to be cut by the tool to form curved flanks for the cutting parts of the cutters, the lower face of each cutter adjacent the outer end of the cutter being pitched to provide bottom clearance during operation, the forward face of each cutter adjacent its outer end being pitched to have back slope, the forward tip of each cutter being cut away to have a drag action, the balance of the cutting edge of each cutter formed where the forward face and lower face joins being keen, the angle of one of the cutting edges being different than that of the others.

LAWSON A. SMITH.

REFERENCES CITED

The following references are of record in the file of this patent:

UNITED STATES PATENTS

| Number | Name | Date |
| --- | --- | --- |
| 163,503 | McKay | May 18, 1875 |
| 281,687 | Hanscom | July 24, 1883 |
| 687,724 | Cadell | Dec. 3, 1901 |
| 1,354,848 | Schilling et al. | Oct. 5, 1920 |
| 1,359,965 | Claudon | Nov. 23, 1920 |
| 2,057,769 | Dowling et al. | Oct. 20, 1936 |
| 2,188,631 | Kraus | Jan. 30, 1940 |
| 2,204,855 | Healey | June 18, 1940 |
| 2,283,491 | Daley | May 19, 1942 |

FOREIGN PATENTS

| Number | Country | Date |
| --- | --- | --- |
| 1,585 | Great Britain | 1908 |
| 228,653 | Great Britain | Feb. 12, 1925 |
| 346,689 | Germany | Jan. 6, 1922 |

OTHER REFERENCES

American Machinist, Mar. 31, 1921, pp. 549–550.
American Machinist, June 21, 1923, p. 921. Pub. by McGraw-Hill Pub. Co., 330 West 42nd Street, New York, N. Y.